United States Patent
Ishida

Patent Number: 5,325,321
Date of Patent: Jun. 28, 1994

[54] HIGH SPEED PARALLEL MULTIPLICATION CIRCUIT HAVING A REDUCED NUMBER OF GATE STAGES

[75] Inventor: Ryuji Ishida, Tokyo, Japan
[73] Assignee: NEC Corporation, Tokyo, Japan
[21] Appl. No.: 87,614
[22] Filed: Jul. 2, 1993
[30] Foreign Application Priority Data
Jul. 2, 1992 [JP] Japan .................... 4-175135
[51] Int. Cl.$^5$ ............................. G06F 7/52
[52] U.S. Cl. ........................................ 364/760
[58] Field of Search ............... 364/760, 754, 757, 759
[56] References Cited
U.S. PATENT DOCUMENTS

| | | | |
|---|---|---|---|
| 4,644,488 | 2/1987 | Nathan | 364/757 |
| 4,813,008 | 3/1989 | Shigehara et al. | 364/760 |
| 4,817,029 | 3/1989 | Finegold | 364/760 |
| 4,991,131 | 2/1991 | Yeh et al. | 364/760 |
| 5,040,139 | 8/1991 | Tran | 364/760 |
| 5,231,415 | 7/1993 | Hagihara | 364/760 |

Primary Examiner—Tan V. Mai
Attorney, Agent, or Firm—Whitham & Marhoefer

[57] ABSTRACT

A parallel multiplication circuit includes a plurality of Booth's decoders, a plurality of partial product generation circuits, and a plurality of full adders. Each Booth's decoder is constructed in accordance with the following decode signal generating logic:

$$\overline{T_w} = Y_i \oplus Y_{i-1}$$

$$\overline{P_u} = Y_{i+1}$$

$$\overline{Z} = Y_{i+1} \oplus Y_i \cdot Y_i \oplus Y_{i-1}$$

Each partial product generation circuit is constructed in accordance with the following partial product generating logic:

$$PP = (T_w \cdot X_i + T_w \cdot X_{i-1}) \oplus P_u + Z$$

2 Claims, 3 Drawing Sheets

HIGH SPEED PARALLEL MULTIPLICATION CIRCUIT HAVING A REDUCED NUMBER OF GATE STAGES

BACKGROUND OF THE INVENTION

1. Field of the Invention

The present invention relates to a parallel multiplication circuit, and more specifically to a high speed multiplication circuit using a second-order Booth's decode algorithm.

2. Description of related art

In the prior art, this type of parallel multiplication circuits have been constructed to use a Booth's decode circuit so as to generate three control signals from data of three continuous bits of an inputted multiplier. The three control signals are indicative of (1) whether the data is single or double, (2) whether the data is positive or negative, and (3) whether or not the data is zero (0), respectively.

For example, one typical Booth's decoder incorporated in the conventional parallel multiplication circuit has been constituted to include a first exclusive-NOR gate having a pair of inputs connected to receive a first input "a" and a third input "c", respectively and an output for generating a first output "$\alpha$", a second exclusive-NOR gate having a pair of inputs connected to receive a second input "b" and the third input "c", respectively, an OR gate having a pair of inputs connected to the outputs of the first and second exclusive-NOR gates, respectively, a NAND gate having a pair of inputs connected to an output of the OR gate and the third input "c", respectively and an output for generating a second output "$\beta$", and an inverter having an input connected to the output of the OR gate and an output for generating a third output "$\gamma$".

Here, assuming that three bits of data of a multiplier inputted to the Booth's decode circuit are called "a", "b" and "c" in the order from its least significant bit towards its most significant bit, a control signal $\alpha$ indicating that the data is double is generated by a logical equation expressed as follows:

$$\alpha = (a \oplus c) \cdot (b \oplus c)$$

Similarly, a control signal $\beta$ indicating that the data is positive is generated by a logical equation expressed as follows:

$$\beta = \overline{\{(a \oplus c) + (b \oplus c)\} \cdot c}$$

In addition, a control signal $\gamma$ indicating that the data is zero (0) is generated by a logical equation expressed as follows:

$$\gamma = \overline{(a \oplus c) + (b \oplus c)}$$

The following TABLE I shows the truth values of the above mentioned logical equations.

TABLE I

| a | b | c | Actual Value | $\alpha$ | $\beta$ | $\gamma$ |
|---|---|---|---|---|---|---|
| 0 | 0 | 0 | 0 | 0 | 1 | 1 |
| 1 | 0 | 0 | 1 | 0 | 1 | 0 |
| 0 | 1 | 0 | 1 | 0 | 1 | 0 |
| 1 | 1 | 0 | 2 | 1 | 1 | 0 |
| 0 | 0 | 1 | −2 | 1 | 0 | 0 |
| 1 | 0 | 1 | −1 | 0 | 0 | 0 |
| 0 | 1 | 1 | −1 | 0 | 0 | 0 |

TABLE I-continued

| a | b | c | Actual Value | $\alpha$ | $\beta$ | $\gamma$ |
|---|---|---|---|---|---|---|
| 1 | 1 | 1 | 0 | 0 | 1 | 1 |

For example, assuming that "1, 0, 1" is inputted to the inputs "a", "b" and "c" of the above mentioned Booth's decoder, an actual value is "−1", and "0, 0, 0" is outputted from the outputs "$\alpha$", "$\beta$" and "$\gamma$".

By using the above mentioned Booth's decoder and a partial product generation circuit, the conventional parallel multiplication circuits have been constructed.

However, the parallel multiplication circuits using the above mentioned Booth's decoder have been complicated in construction and large in circuit scale, because the Booth's decoder is configured to generate the output signals accurately indicating that (1) whether the data is single or double, (2) whether the data is positive or negative, and (3) whether or not the data is zero (0), respectively. In addition, the number of required series-connected gate stages is large in the conventional parallel multiplication circuits, and therefore, the operation speed of the multiplication circuits is low.

SUMMARY OF THE INVENTION

Accordingly, it is an object of the present invention to provide a parallel multiplication circuit which has overcome the above mentioned defect of the conventional one.

Another object of the present invention is to provide a parallel multiplication circuit having a simplified circuit construction and a high operation speed.

The above and other objects of the present invention are achieved in accordance with the present invention by a parallel multiplication circuit comprising at least one Booth's decoder receiving a multiplier for generating decode signals Tw, Pu and Z, a plurality of partial product generation circuits connected to receive the decoded signals from the at least one Booth's decoder and a multiplicand for generating a partial product, PP, and a plurality of full address connected to sequentially adding the partial product of the partial product generation circuits, the at least one Booth's decoder being constructed in accordance with the following decode signal generating logic:

$$T_w = \overline{Y_j \oplus Y_{j-1}}$$

$$P_u = \overline{Y_{j+1}}$$

$$Z = \overline{Y_{j+1} \oplus Y_j \cdot Y_j \oplus Y_{j-1}}$$

where $Y_{j-1}$, $Y_j$ and $Y_{j+1}$ are three continuous bits of the multiplier inputted, respectively, and $Y_{j-1}$, is the least significant bit of the three continuous bits $Y_{j-1}$, $Y_j$ and $Y_{j+1}$, and $Y_{j+1}$ is the most significant bit of the three continuous bits $Y_{j-1}$, $Y_j$ and $Y_{j+1}$, each of the partial product generation circuit being constructed in accordance with the following partial product generating logic:

$$PP = \overline{(T_w X_i + T_w X_{i-1}) \oplus P_u + Z}$$

where $X_i$ and $X_{i-1}$ are two continuous bits of the multiplicand inputted, and $X_{i-1}$ is the least significant bit of the two continuous bits $X_i$ and $X_{i-1}$, and $X_i$ is the most significant bit of the two continuous bits $X_i$ and $X_{i-1}$.

The above and other objects, features and advantages of the present invention will be apparent from the following description of preferred embodiment of the invention with reference to the accompanying drawings.

DESCRIPTION OF THE PREFERRED EMBODIMENTS

Figure 1A:
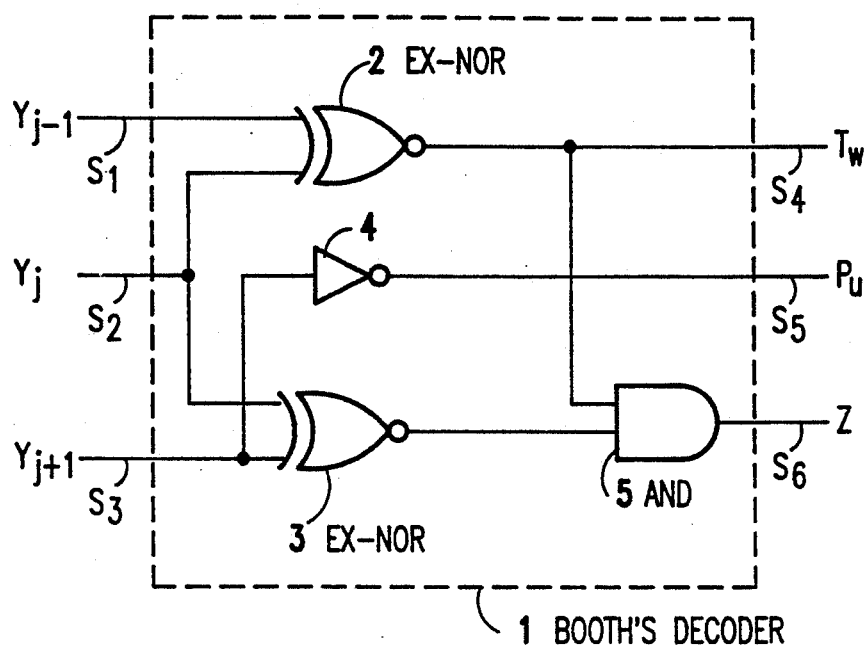
FIG. 1A is a logic circuit diagram of a Booth's decoder incorporated in one embodiment of the parallel multiplication circuit in accordance with the present invention.

Referring to FIG. 1A, there is shown a logic circuit diagram of a Booth's decoder incorporated in one embodiment of the parallel multiplication circuit in accordance with the present invention.

The shown Booth's decoder is generally designated with Reference 1, and has three input terminals S1, S2 and S3 for receiving three continuous bits $Y_{j-1}$, $Y_j$ and $Y_{j+1}$ of a multiplier inputted, respectively, and three output terminals S4, S5 and S6 for supplying three decode outputs Tw, Pu and Z of the Booth's decoder, respectively. Here, $Y_{j-1}$ is the least significant bit (LSB) of the three continuous bits $Y_{j-1}$, $Y_j$ and $Y_{j+1}$ of the multiplier, and $Y_{j+1}$ is the most significant bit (MSB) of the three continuous bits $Y_{j-1}$, $Y_j$ and $Y_{j+1}$ of the multiplier. $Y_j$ is an intermediate significant bit of the three continuous bits $Y_{j-1}$, $Y_j$ and $Y_{j+1}$ of the multiplier.

The Booth's decoder 1 includes an exclusive-NOR gate 2 having a pair of inputs connected to the input terminals S1 and S2 and an output connected to the output terminal S5, and another exclusive-NOR gate 3 having a pair of inputs connected to the input terminals S2 and S3. The Booth's decoder 1 also includes an inverter 4 having its input connected to the input terminal S3 and its output connected to the output terminal S5, and an AND gate 5 having a pair of inputs connected to the output of the exclusive-NOR gate 2 and an output of the exclusive-NOR gate 3. An output of the AND gate 5 is connected to the output terminal S6.

Figure 1B:
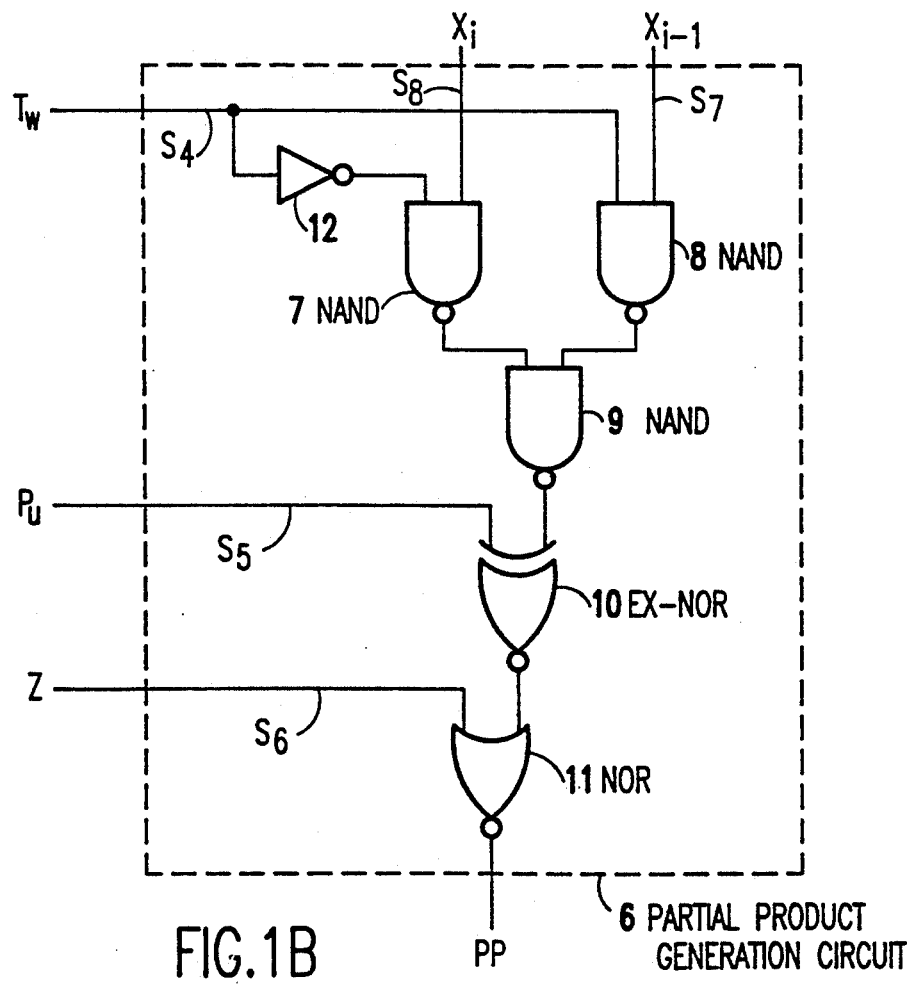
FIG. 1B is a logic circuit diagram of a partial product generation circuit incorporated in one embodiment of the parallel multiplication circuit in accordance with the present invention.

Now, referring to FIG. 1B, there is shown a logic circuit diagram of a partial product generation circuit incorporated in one embodiment of the parallel multiplication circuit in accordance with the present invention.

The partial product generation circuit is generally designated with Reference 6, and has two input terminals S7 and S8 for receiving two continuous bits $X_{i-1}$ and $X_i$ of a multiplicand inputted, respectively, and three input terminals S4, S5 and S6 for receiving the three outputs Tw, Pu and Z of the Booth's decoder 1, respectively. In addition, the partial product generation circuit 6 also has an output terminal PP for outputting a partial product. Here, $X_{j-1}$ is the least significant bit of the two continuous bits $X_i$ and $X_{i-1}$ of the multiplicand, and $X_i$ is the most significant bit of the two continuous bits $X_i$ and $X_{i-1}$ of the multiplicand.

The partial product generation circuit 6 includes a first NAND gate 7 having a first input connected to the input terminal S8 and a second input connected through an inverter 12 to the input terminal S4, a second NAND gate 8 having a first input connected to the input terminal S7 and a second input connected to the input terminal S4, and a third NAND gate 9 having a pair of inputs connected to an output of the first and second NAND gates 7 and 8. An output of the NAND gate 9 is connected to one input of an exclusive-NOR gate 10, which has its other input connected to the input terminal S5. An output of the exclusive-NOR gate 10 is connected to one input of a NOR gate 11, which has its other input connected to the input terminal S6. An output of the NOR gate 11 is connected to the output terminal PP.

Here, assuming that the three continuous bits applied to the Booth's decoder 1 are $Y_{j+1}$, $Y_j$ and $Y_{j-1}$ in the order from MSB to LSB, respectively, and MSB and LSB of the two continuous bits applied to the partial product generation circuit 6 are $X_i$ and $X_{i-1}$, respectively, the relation between the output PP of the partial product generation circuit 6 and the inputs $Y_{j+1}$, $Y_j$ and $Y_{j-1}$ and $X_i$ and $X_{i-1}$ are as shown in the following TABLE II.

TABLE II

| $Y_{j+1}$ | $Y_j$ | $Y_{j-1}$ | Tw | Pu | Z | PP |
|---|---|---|---|---|---|---|
| 0 | 0 | 0 | 1 | 1 | 1 | 0 |
| 0 | 0 | 1 | 0 | 1 | 0 | $X_i$ |
| 0 | 1 | 0 | 0 | 1 | 0 | $X_i$ |
| 0 | 1 | 1 | 1 | 1 | 0 | $X_{i-1}$ |
| 1 | 0 | 0 | 1 | 0 | 0 | $\overline{X_{i-1}}$ |
| 1 | 0 | 1 | 0 | 0 | 0 | $\overline{X_i}$ |
| 1 | 1 | 0 | 0 | 0 | 0 | $\overline{X_i}$ |
| 1 | 1 | 1 | 1 | 0 | 1 | 0 |

For example, with $Y_{j+1}$, $Y_j$ and $Y_{j-1}$ = "0, 0, 0" or "1, 1, 1", the output PP becomes "0". With $Y_{j+1}$, $Y_j$ and $Y_{j-1}$ = "0, 0, 1" or "0, 1, 0", the output PP becomes "$X_i$", namely, the input "$X_i$" is outputted as it is. In addition, with $Y_{j+1}$, $Y_j$ and $Y_{j-1}$ = "0, 1, 1", the output PP becomes "$X_{i-1}$", namely, the value shifted leftward by one bit (doubled value) is outputted from the output PP. With $Y_{j+1}$, $Y_j$ and $Y_{j-1}$ = "1, 0, 0", the output PP becomes an inverted value of "$X_{i-1}$", namely, an inverted number of the double value. Further, with $Y_{j+1}$, $Y_j$ and $Y_{j-1}$ = "1, 0, 1" or "1, 1, 0", the output PP becomes an inverted value of "$X_i$", namely, an inverted number of the input "$X_i$". Thus, a partial product is obtained on the basis of an algorithm of the Booth's decoder 1.

In addition, the output PP of the shown partial product generating circuit 6 is generated in accordance with the following equation:

$$PP = \overline{(T_w \cdot X_i + T_w \cdot X_{i-1}) \oplus P_u + Z}$$

Accordingly, if the input Z is "1", both of the inputs Tw and Pu become "don't care". This will be understood from the truth table of the following TABLE III.

TABLE III

| 3rd. INPUT $Y_{j+1}$ | 2nd. INPUT $Y_j$ | 1st. INPUT $Y_{j-1}$ | 1st. OUTPUT Tw | 2nd. OUTPUT Pu | 3rd. OUTPUT Z | PP |
|---|---|---|---|---|---|---|
| 0 | 0 | 0 | X | X | 1 | 0 |
| 0 | 0 | 1 | 0 | 1 | 0 | $X_i$ |
| 0 | 1 | 0 | 0 | 1 | 0 | $X_i$ |
| 0 | 1 | 1 | 1 | 1 | 0 | $X_{i-1}$ |
| 1 | 0 | 0 | 1 | 0 | 0 | $\overline{X_{i-1}}$ |
| 1 | 0 | 1 | 0 | 0 | 0 | $\overline{X_i}$ |
| 1 | 1 | 0 | 0 | 0 | 0 | $\overline{X_i}$ |
| 1 | 1 | 1 | X | X | 1 | 0 |

X: Don't Care

Accordingly, the logical equations of the Booth's decoder 1 can be simplified, and the outputs Tw, Pu and Z can be expressed as follows:

$$T_w = \overline{Y_i \oplus Y_{i-1}}$$

$$P_u = \overline{Y_{i+1}}$$

$$Z = \overline{Y_{i+1} \oplus Y_i} \cdot \overline{Y_i \oplus Y_{i-1}}$$

Figure 2:
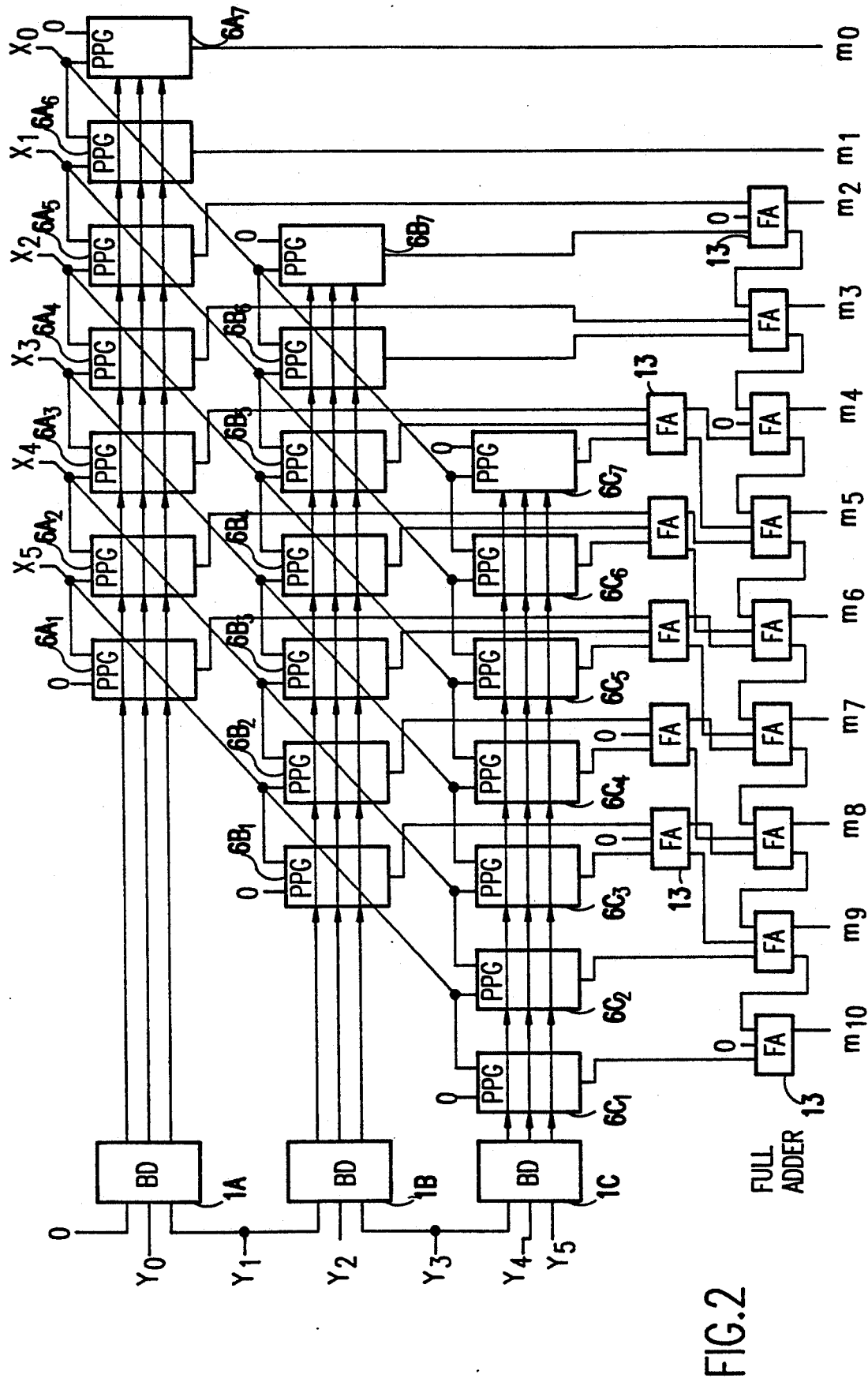
FIG. 2 is a block diagram of one embodiment of the parallel multiplication circuit in accordance with the present invention.

Referring to FIG. 2, there is shown a block diagram of one embodiment of the parallel multiplication circuit in accordance with the present invention. The shown parallel multiplication circuit is configured to perform a multiplication of 6 bits×6 bits.

The shown parallel multiplication circuit includes three Booth's decoders 1A, 1B and 1C, labelled "BD", each constructed as shown in FIG. 1A, twenty-one partial product generation circuits $6A_1$ to $6A_7$, $6B_1$ to $6B_7$, and $6C_1$ to $6C_7$, labelled "PPG", each constructed as shown in FIG. 1B, and fourteen full adders 13 labelled "FA", which are connected as shown. In addition, the 6-bit multiplier applied to the multiplication circuit is expressed as $Y_5$, $Y_4$, $Y_3$, $Y_2$, $Y_1$ and $Y_0$ in the order from MSB to LSB, and the 6-bit multiplicand applied to the multiplication circuit is expressed as $X_5$, $X_4$, $X_3$, $X_2$, $X_1$ and $X_0$ in the order from MSB to LSB. Output bits of the multiplication circuit are expressed as "$m_{10}$", "$m_9$", ... "$m_1$" and "$m_0$" in the order from MSB to LSB.

First, the inputs $Y_{j-1}$, $Y_j$ and $Y_{j+1}$ of the Booth's decoder 1A are supplied with "0", $Y_0$ and $Y_1$, respectively, and similarly, the inputs $Y_{j-1}$, $Y_j$ and $Y_{j+1}$ of the Booth's decoder 1B are supplied with $Y_1$, $Y_2$ and $Y_3$, respectively. Furthermore, the inputs $Y_{j-1}$, $Y_j$ and $Y_{j+1}$ of the Booth's decoder 1C are supplied with $Y_3$, $Y_4$ and $Y_5$, respectively.

In addition, the outputs Tw, Pu and Z of the Booth's decoder 1A are connected to the inputs Tw, Pu and Z of each of the partial product generation circuits $6A_1$ to $6A_7$, respectively. Similarly, the outputs Tw, Pu and Z of the Booth's decoder 1B are connected to the inputs Tw, Pu and Z of each of the partial product generation circuits $6B_1$ to $6B_7$, respectively, and the outputs Tw, Pu and Z of the Booth's decoder 1C are connected to the inputs Tw, Pu and Z of each of the partial product generation circuits $6C_1$ to $6C_7$, respectively.

On the other hand, "0" is applied to the input Xi of each of the partial product generation circuits $6A_1$, $6B_1$ and $6C_1$, and the bit $X_5$ of the multiplicand is supplied to the input $X_{i-1}$ of each of the partial product generation circuits $6A_1$, $6B_1$ and $6C_1$ and the input Xi of each of the partial product generation circuits $6A_2$, $6B_2$ and $6C_2$, respectively. The bit $X_4$ of the multiplicand is supplied to the input $X_{i-1}$ of each of the partial product generation circuits $6A_2$, $6B_2$ and $6C_2$. Similarly, the bits $X_4$ and $X_3$ of the multiplicand are supplied to the input $X_i$ and the input $X_{i-1}$ of each of the partial product generation circuits $6A_3$, $6B_3$ and $6C_3$, respectively, and the bits $X_3$ and $X_2$ of the multiplicand are supplied to the input $X_i$ and the input $X_{i-1}$ of each of the partial product generation circuits $6A_4$, $6B_4$ and $6C_4$, respectively. In addition, the bits $X_2$ and $X_1$ of the multiplicand are supplied to the input $X_i$ and the input $X_{i-1}$ of each of the partial product generation circuits $6A_5$, $6B_5$ and $6C_5$, respectively, and the bits $X_1$ and $X_0$ of the multiplicand are supplied to the input $X_i$ and the input $X_{i-1}$ of each of the partial product generation circuits $6A_6$, $6B_6$ and $6C_6$, respectively. The bit $X_0$ of the multiplicand and "0" are supplied to the input $X_i$ and the input $X_{i-1}$ of each of the partial product generation circuits $6A_7$, $6B_7$ and $6C_7$, respectively.

Figure 3:
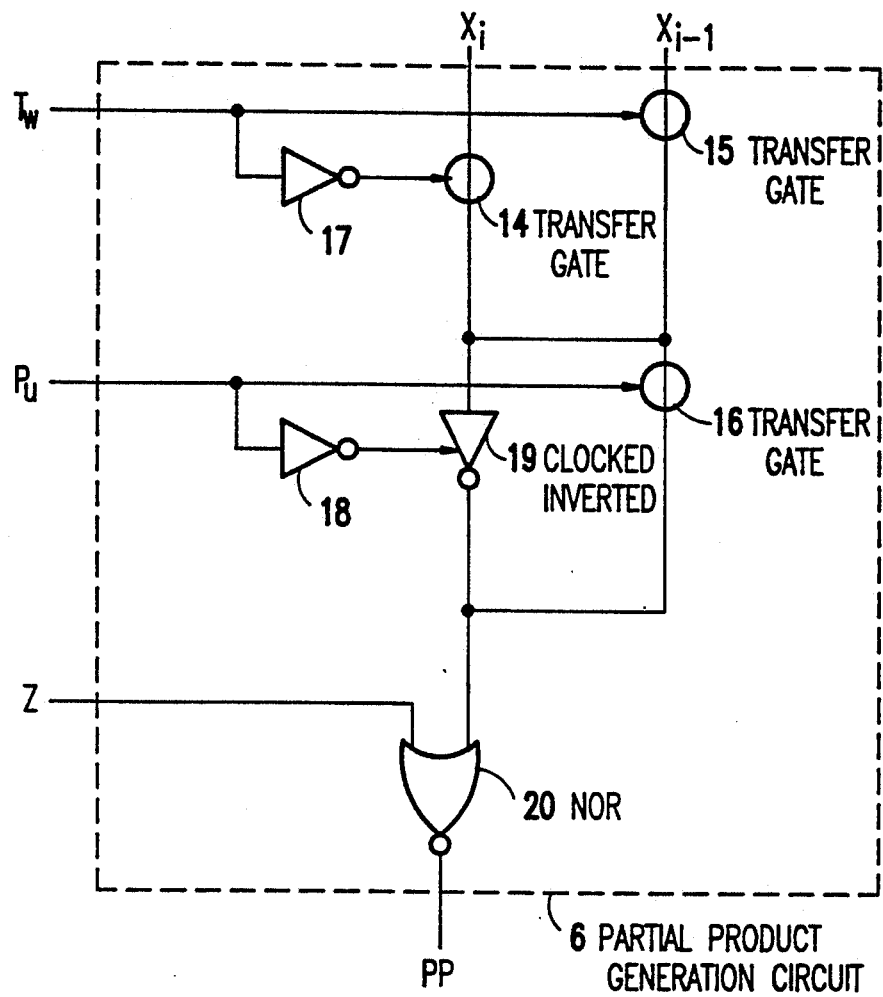
FIG. 3 is a logic circuit diagram of a partial product generation circuit incorporated in another embodiment of the parallel multiplication circuit in accordance with the present invention.

As well known to persons in the art, an output of the partial product generation circuits $6A_6$ and $6A_7$ are supplied as the outputs "$m_1$" and "$m_0$" of the multiplication circuit, and an outputs of the other partial product generation circuits $6A_1$ to $6A_5$, $6B_1$ to $6B_7$, and $6C_1$ to $6C_7$ are supplied to the full adders 13 as shown in FIG. 3, and the full adders 13 are interconnected 13 as shown in FIG. 3 so as to generate the other outputs "$m_{10}$" to "$m_2$" of the multiplication circuit. Operation of the overall multiplication circuit is also well known to persons in the art, and therefore, explanation thereof will be omitted.

In the above mentioned parallel multiplication circuit, the circuit scale of each one Booth's decoder can be reduced to 20 transistors from 24 transistors which were required in the conventional Booth's decoder. In addition, assuming that each of the exclusive-OR gate, the exclusive-NOR gate, the AND gate and the OR gate is two stages, the number of necessary series-connected gate stages can be reduced to 6 stages from 9 stages which were required in the conventional circuits, in the Booth's decoder and the partial product generation circuit in combination.

Referring to FIG. 3, there is shown a logic circuit diagram of a partial product generation circuit incorporated in another embodiment of the parallel multiplication circuit in accordance with the present invention.

The partial product generation circuit 6 shown in FIG. 3 includes three transfer gates 14, 15 and 16, two inverters 17 and 18, a clocked inverter 19 and a NOR gate 20, connected as shown. Specifically, the MSB bit $X_i$ of the two continuous bits $X_i$ and $X_{i-1}$ of the multiplicand is connected to a data input of the transfer gate 14, and the LSB bit $X_{i-1}$ of the two continuous bits $X_i$ and $X_{i-1}$ is connected to a data input of the transfer gate 15. A data output of the transfer gate 14 is connected directly to a data output of the transfer gate 15, and also connected to a data input of the transfer gate 16 and a data input of the clocked inverter 19. A data output of the transfer gate 16 is connected directly to a data output of the clocked inverter 19, and also connected to a first input of the NOR gate 20. The output Tw of the Booth's decoder is connected to an input of the inverter 17 and a control input of the transfer gate 15, and an output of the inverter 17 is connected to a control input of the transfer gate 14. The output Pu of the Booth's decoder is connected to an input of the inverter 18 and a control input of the transfer gate 16, and an output of the inverter 18 is connected to a control input of the clocked inverter 19. The output Z of the Booth's decoder is connected to a second input of the NOR gate 20.

Since the partial product generation circuit 6 shown in FIG. 3 operates similarly to the partial product generation circuit 6 shown in FIG. 1A, explanation of the operation of the partial product generation circuit 6 shown in FIG. 3 will be omitted.

As will be apparent from the above, in the parallel multiplication circuit in accordance with the present invention including a plurality of Booth's decoders, a plurality of partial product generation circuits, and a plurality of full adders, each Booth's decoder is constructed on the basis of the following decode signal generating logic:

$$\overline{T_w} = Y_i \oplus Y_{i-1}$$

$$\overline{P_u} = Y_{i+1}$$

$$Z = Y_{i+1} \oplus Y_i \cdot \overline{Y_i \oplus Y_{i-1}}$$

and each partial product generation circuit is constructed on the basis of the following partial product generating logic:

$$PP = \overline{(T_w \cdot X_i + T_w \cdot X_{i-1}) \oplus P_u + Z}$$

With this arrangement, the Booth's decoder can be simplified, and the circuit scale of the Booth's decoder can be reduced by about 20%. In addition, the gate stages of the combined Booth's decoder and partial product generation circuit can be reduced by about 30%. Therefore, the circuit scale of the overall multiplication circuit can be reduced, and the operation speed can be elevated.

The invention has thus been shown and described with reference to the specific embodiments. However, it should be noted that the present invention is in no way limited to the details of the illustrated structures but changes and modifications may be made within the scope of the appended claims.

I claim:

1. A parallel multiplication circuit comprising:
   at least one Booth's decoder receiving a multiplier for generating decode signals $T_w$, $P_u$ and Z,
   a plurality of partial product generation circuits connected to receive the decoded signals from said at least one Booth's decoder and a multiplicand for generating a partial product PP, and
   a plurality of full address connected to sequentially add the partial product of said partial product generation circuits, said at least one Booth's decoder being constructed in accordance with the following decode signal generation logic:

$$\overline{T_w} = Y_i \oplus Y_{i-1}$$

$$\overline{P_u} = Y_{i+1}$$

$$Z = Y_{i+1} \oplus Y_i \cdot \overline{Y_i \oplus Y_{i-1}}$$

where $Y_{j-1}$, $Y_j$ and $Y_{j+1}$ are three continuous bits of the multiplier inputted, respectively, and $Y_{j-1}$ is the least significant bit of the three continuous bits $Y_{j-1}$, $Y_j$ and $Y_{j+1}$, and $Y_{j+1}$ is the most significant bit of the three continuous bits $Y_{j-1}$, $Y_j$ and $Y_{j+1}$, each of said partial product generation circuits being constructed in accordance with the following partial product generating logic:

$$PP = \overline{(T_w \cdot X_i + T_w \cdot X_{i-1}) \oplus P_u + Z}$$

where $X_i$ and $X_{i-1}$ are two continuous bits of the multiplicand inputted, and $X_{i-1}$ is the least significant bit of the two continuous bits $X_i$ and $X_{i-1}$, and $X_i$ is the most significant bit of the two continuous bits $X_i$ and $X_{i-1}$, said at least one Booth's decoder including a first exclusive-NOR gate receiving the bits $Y_{j-1}$ and $Y_j$ for outputting the decode signal $T_w$, an inverter receiving the bit $Y_j$ for outputting the decode signal $P_u$, a second exclusive-NOR gate receiving the bits $Y_j$ and $Y_{j+1}$, and an AND gate having a pair of inputs connected to an output of said first and second exclusive-NOR gates for generating the decode signal Z, each of said partial product generation circuits including:
   a first NAND gate having a first input connected to receive the bit $X_i$ and a second input connected to receive through an inverter the decode signal $T_w$ of a corresponding Booth's decoder,
   a second NAND gate having a first input connected to receive the bit $X_{i-1}$ and a second input connected to receive the decode signal $T_w$ of said corresponding Booth's decoder,
   a third NAND gate having a pair of inputs connected to an output of said first and second NAND gates, respectively,
   an exclusive-NOR gate having a first input connected to an output of said third NAND gate and a second input connected to receive the decode signal $P_u$ of said corresponding Booth's decoder, and
   a NOR gate having a first input connected to an output of said exclusive-NOR gate and a second input connected to receive the decode signal Z of said corresponding Booth's decoder, an output of said NOR gate generative the partial product PP.

2. A parallel multiplication circuit comprising:
   at least one Booth's decoder receiving a multiplier for generating decode signals $T_w$, $P_u$ and Z,
   a plurality of partial product generation circuits connected to receive the decoded signals from said at least one Booth's decoder and a multiplicand for generating a partial product PP, and
   a plurality of full address connected to sequentially add the partial product of said partial product generation circuits, said at least one Booth's decoder being constructed in accordance with the following decode signal generation logic:

$$\overline{T_w} = Y_i \oplus Y_{i-1}$$

$$\overline{P_u} = Y_{i+1}$$

$$Z = Y_{i+1} \oplus Y_i \cdot \overline{Y_i \oplus Y_{i-1}}$$

where $Y_{j-1}$, $Y_j$ and $Y_{j+1}$ are three continuous bits of the multiplier inputted, respectively, and $Y_{j-1}$ is the least significant bit of the three continuous bits $Y_{j-1}$, $Y_j$ and $Y_{j+1}$, and $Y_{j+1}$ is the most significant bit of the three continuous bits $Y_{j-1}$, $Y_j$ and $Y_{j+1}$, each of said partial product generation circuits being constructed in accordance with the following partial product generating logic:

$$PP = \overline{(T_w \cdot X_i + T_w \cdot X_{i-1}) \oplus P_u + Z}$$

where $X_i$ and $X_{i-1}$ are two continuous bits of the multiplicand inputted, and $X_{i-1}$ is the least significant bit of the two continuous bits $X_i$ and $X_{i-1}$, and $X_i$ is the most significant bit of the two continuous bits $X_i$ and $X_{i-1}$, said at least one Booth's decoder including a first exclusive-NOR gate receiving the bits $Y_{j-1}$ and $Y_j$ for outputting the decode signal $T_w$, an inverter receiving the bit $Y_j$ for outputting the decode signal $P_u$, a second exclusive-NOR gate receiving the bits $Y_j$ and $Y_{j+1}$, and an AND gate having a pair of inputs connected to an output of said first and second exclusive-NOR gates for generating the decode signal Z, each of said partial product generation circuits including:

a first transfer gate having a data input connected to receive the bit $X_i$ and a control input connected to receive through an inverter the decode signal $T_w$ of a corresponding Booth's decoder, a second transfer gate having a data input connected to receive the bit $X_{i-1}$ and a control input connected to receive the decode signal $T_w$ of said corresponding Booth's decoder, an output of said second transfer gate, a clocked inverter having a data input connected to said output of said first transfer gate and a control input connected to receive through an inverter the decode signal $P_u$ of said corresponding Booth's decoder, a third transfer gate having a data input connected to said output of said first transfer gate and a control input connected to receive the decode signal $P_u$ of said corresponding Booth's decoder, an output of said clocked inverter being connected directly to an output of said third transfer gate; and a NOR gate having a first input connected to said output of said clocked inverter and a second input connected to receive the decode signal Z of said corresponding Booth's decoder, an output of said NOR gate generating the partial product PP.

* * * * *